United States Patent

[11] 3,622,556

[72] Inventor David E. O'Connor
Cincinnati, Ohio
[21] Appl. No. 856,195
[22] Filed Sept. 8, 1969
[45] Patented Nov. 23, 1971
[73] Assignee The Procter & Gamble Company
Cincinnati, Ohio

[54] PREPARING LIGHT-COLORED PROTEIN ISOLATE FROM SUNFLOWER MEAL BY ALKALI EXTRACTION UNDER AN INERT GAS BLANKET FOLLOWED BY MEMBRANE ULTRAFILTRATION
7 Claims, No Drawings

[52] U.S. Cl....................................................... 260/123.5, 99/17
[51] Int. Cl........................................................ A23j 1/14
[50] Field of Search............................................ 260/123.5

[56] References Cited
OTHER REFERENCES
Cereal Chemistry, 25, 399– 406 (1948), Smith et al.
Chemical Engineering Progress, 64, No. 12, pp. 31– 43, Dec., 1948, Michaels Primary Examiner—Howard E. Schain
Attorney—Edmund J. Sease ABSTRACT: Light-colored protein is recovered from sunflower meal by alkali extracting the meal under an inert gas blanket to form a solid spent meal phase and a liquid extract phase separating the phases, and acid precipitating protein from the extract phase. In another and preferred embodiment, the extract directly after it is separated from the spent meal in the separation step is subjected to membrane ultrafiltration to remove green color-forming precursors and to form a retentate which does not contain these precursors, and protein is recovered from the retentate. The isolated protein is suitable for use as a protein supplement additive for food products without imparting to the food products an unappetizing color.

PREPARING LIGHT-COLORED PROTEIN ISOLATE FROM SUNFLOWER MEAL BY ALKALI EXTRACTION UNDER AN INERT GAS BLANKET FOLLOWED BY MEMBRANE ULTRAFILTRATION

BACKGROUND OF THE INVENTION

This invention relates to a method for isolating protein from sunflower meal.

When oil is expelled from sunflower seeds, for example, by any convenient method, a resulting byproduct is the residue which is denoted sunflower meal. This meal can be a valuable source of protein which can be used for nutritious purposes, for example, for addition to food products such as breakfast cereals, meat products, peanut butter, imitation dairy products, pet foods and snack foods to supplement the protein therein and/or to provide a protein constituent.

One method of isolating protein from sunflower meal involves alkali extraction of the meal to extract protein therefrom followed by acid precipitation of protein from the extract. In the alkali extraction step, the meal is first admixed with water, the weight ratio of water to meal ordinarily ranging from 10:1 to 25:1. The pH of the water is then adjusted to range from 9 to 11 by the addition of a strong base, for example, sodium hydroxide. The meal/basified water mixture is then agitated, for example, from 15 to 90 minutes whereby protein and some nonprotein impurities are extracted from the meal to form a liquid extract phase and a solid residue of spent meal. The extract phase which is a solution comprising water, protein, and nonprotein impurities is then separated from the spent meal, for example, by centrifugation. This extract phase is then treated in an acid precipitation step. In this step, the pH of the extract phase is adjusted to range from 3.5 to 6 by the addition of an acid, for example hydrochloric acid or sulfuric acid. This pH adjustment step, that is, the addition of the acid, precipitates protein from the extract phase. It is preferable that the pH of the extract phase be adjusted to 4.5 by the addition of the acid since pH 4.5 is the isoelectric point of the protein, that is, the point where the protein is least soluble in water; and therefore at this point, the most protein is recoverable from the water by an acid precipitation method. The precipitated protein is then recovered from the acid-adjusted extract phase by any convenient physical separation method, for example, by centrifugation. The entire process, that is the alkali extraction, acid precipitation and separation operations are ordinarily carried out utilizing ambient temperatures, that is without the application of external heating or cooling. The recovered precipitated protein is denoted protein isolate. The protein isolate ordinarily has an intense green color. This is because the meal starting material has as a constituent green color-forming precursors* which in a conventional alkali extraction/acid precipitation process result in the formation of this green color in the protein isolate. Once it appears, this green color cannot be removed from the isolate product by dialysis or other conventional means of purification. If the intensely colored isolate is added to food products as a protein supplement additive, the green color is imparted to the food product so that it is characterized either by a green cast or by a green color. This green cast or green color is ordinarily considered unappetizing. Thus, protein isolated from sunflower meal in this way is not useful as a nutritious supplement for foods except those few foods with which a green color is normally associated, for example, split pea soup. This alkali extraction/acid precipitation method of recovering protein from sunflower meal and the disadvantage of providing green color-characterized protein isolate is described in an article by Smith, A. K., and Johnson, V., in *Cereal Chemistry* 25, 399–406 (1948). This *Cereal Chemistry* article indicates that green color can be temporarily removed from the protein isolate by the use of reducing agents such as dithionite salts during alkali extraction. The protein recovered after the use of this reducing agent may be light colored, but the green color appears if this isolated protein is utilized as a supplement in foods with even a slightly basic pH.

SUMMARY OF THE INVENTION

In one embodiment of this invention, alkali extraction and acid precipitation are carried out by the conventional method described above except that the constituents are maintained under an inert gas blanket during the alkali extraction operation and previous to the time when the constituents are adjusted to acid pH in the acid precipitation step. This process produces a light-colored protein which can be utilized as a supplement for foods with either acid or neutral pH; however, the green color appears in the protein if it is utilized as a supplement in foods with even a slightly basic pH. Thus, this method is a novel method and gives the same results as the reducing agent method described above.

In another embodiment of this invention sunflower meal is treated in a conventional alkali extraction step except that the constituents during alkali extraction are maintained under an inert gas blanket, that is, under an inert gas atmosphere. The spent meal phase and the extract phase resulting from the alkali extraction operation are separated from each other just as in the conventional operation except that inert gas blanketing is maintained over the extract phase during this separation. Then, and this is the novel aspect of this embodiment compared to the embodiment described in the above paragraph, the separated extract which contains water, protein, green color-forming precursors and other constituents, still under inert gas blanketing, is subjected to membrane ultrafiltration. As a result of this ultrafiltration process green color-forming precursors are removed from the extract. The protein can then be recovered from this ultrafiltration processed extract either by conventional acid precipitation followed by physical separation of the precipitated protein or by further ultrafiltration followed by drying. The protein isolated by this embodiment of the present invention is light colored and can be utilized in any type of food products, that is, food products having acid, neutral or basic pH's without intense green color appearing.

DETAILED DESCRIPTION OF THE INVENTION

The sunflower meal for use in this invention can be derived from sunflower seeds by any conventional method. For example, sunflower seeds can be oil expelled or solvent extracted in processes described at pages 663 through 713 of *Bailey's Industrial Oil and Fat Products*, 3rd edition (1964), John Wiley & Sons, New York. The residue left after the oil recovery is sunflower meal suitable for use in this invention. The meal can be derived from any variety of sunflower seeds. For example, varieties such as Amvaric, Peredovik, Smena or Mingren are suitable. Preferably, dehulled seeds are utilized.

Turning now to the first embodiment of this invention which is mentioned above, the sunflower meal is treated in an alkali extraction step with conventional admixing of meal and water, water to meal weight ratios, basic pH adjustment, and agitation conditions described in detail on page 2 of this application. How during the alkali extraction step the constituents are blanketed with an inert gas atmosphere.

Turning with particularity to this inert gas blanketing which is a novel feature of this invention, the sunflower meal can be admixed with water already under an inert gas blanket, followed by basic pH adjustment. Or, the water and meal can be admixed, then this combination can be blanketed with inert gas, and then the pH can be adjusted to the required basic level. Thus, what is required is that at all times when protein extract is at basic pH, this basified protein extract must be under an inert gas blanket. If inert gas blanketing is not used under these circumstances, intense green color which cannot be removed by any ordinary purification method will appear.

Suitable inert gases for use in this method and for any purpose where inert gases are utilized hereinafter include, for ex-

---

*The term "green color-forming precursors" is utilized herein to include those components in the meal when subjected to basic conditions during conventional alkali extracting in the presence of air are essential to the formation of and participate in the formation of green color. Examples of these components are phenolic materials such as chlorogenic acid.

ample, nitrogen, argon, helium, fluorochloroalkanes having boiling points of less than 50° F., and water vapor.

As a result of this alkali extraction step utilizing inert gas blanketing, a solid spent meal phase and a liquid extract phase containing extracted protein are formed where the extract phase is colorless.

This mixture, still under inert gas blanketing, is separated, for example, by conventional centrifugation to recover the extract phase which is still retained under inert gas blanketing. Light-colored protein can then be recovered from this extract phase. In one recovery method, the pH of this inert gas-blanketed extract phase is adjusted to conventional acid precipitation pH ranges whereby protein is precipitated as a solid from the extract phase. As soon as the pH of the extract phase becomes acid, the inert gas blanketing can be removed without harmful color effect. The precipitated protein is light colored. The precipitated protein is then isolated from the remaining liquid phase by any conventional physical separation process, for example, by centrifugation.

The isolated protein can be utilized in this state or it can have its pH adjusted as far as pH 7 by the addition of a base such as sodium hydroxide or sodium carbonate. The pH of the isolated protein should not be adjusted to the basic side; this is because at basic pH, the protein will take on an intensely green color. It is preferred that the isolated protein be dried, for example, by freeze-drying or spray-drying before it is utilized as a food additive.

The isolated protein is characterized by a light color, that is, a white, gray, light brown, tan, light green-gray, or very light green color. When is is added as a protein supplement to an acid of neutral pH food product, the food product has an appetizing appearance and is not characterized by a green cast or by the green color normally associated with protein isolated from sunflower meal by conventional alkali extraction/acid precipitation processes. For example, the protein isolated by the process of this embodiment of the invention can be utilized in breakfast cereals or snack foods as a protein supplement thereto without changing the appetizing appearance of these food products.

Turning now to the other and preferred embodiment of this invention, wherein inert gas blanketing and ultrafiltration are utilized, sunflower meal is first alkali extracted under inert gas blanketing just as described above for the first embodiment of this invention. Moreover, the spent meal phase and the protein-containing extract phase are separated under inert gas blanketing just as described above for the first embodiment of this invention. At this point, however, this embodiment differs from the previously explained embodiment in that the separated extract, still under inert gas blanketing, is subjected to a membrane ultrafiltration step whereby green color-forming precursors are removed from the extract.

Membrane ultrafiltration is a relatively new unit operation. It is described in detail in *Chemical Engineering Progress*, 64, No. 12, pages 31 through 43, Dec. 1968. In membrane ultrafiltration, a hydraulic pressure activates separation of solutions into individual components by passage through a semipermeable membrane. Ultrafiltration is the term applied to the separation of relatively high-molecular weight solutes, for example, proteins, from their solvents, such as water and other low-molecular weight materials which are dissolved in the water. It differs from reverse osmosis because that term is applied to the separation of low-molecular weight solutes rather than high-molecular weight solutes. The components which pass through the membrane are denoted the ultrafiltrate. The portion retained by the membrane is a concentrated solution and is denoted the retentate.

In the application of ultrafiltration to the removal of color-forming bodies from the protein-containing extract phase, the extract phase is passed over an ultrafiltration membrane under a pressure ranging from 10 p.s.i.g. to 100 p.s.i.g., preferably 15 p.s.i.g. to 40 p.s.i.g. This pressure can be maintained by the inert gas blanket which is present above the extract phase or by pumping or other suitable means. The membrane has an apparent average pore size radius ranging 10 angstroms to 80 angstroms preferably from 15 angstroms to 70 angstroms. This pore size allows molecules having a molecular weight of 100,000 to 10,000 and less to pass through while not permitting the passing of higher molecular weight molecules such as proteins. For efficiency purposes it is preferred that the extract be passed over the membrane in the form of a thin layer having a thickness ranging from 0.01 to 0.05 inch. The ultrafiltration is conveniently carried out with the extract which is being processed having a temperature ranging from 35° F. to 120° F. The use of temperatures below about 50° F. is useful to retard or prevent bacterial growth in the extract. Bacterial growth is not a problem regardless of the extract temperature if the ultrafiltration process is carried out in less than about 2 hours; the time of ultrafiltration is a matter of choice and depends upon the amount of extract being processed and the size and capacity of the ultrafiltration device utilized. It is preferred to practice the ultrafiltration process utilizing times less than about 2 hours in combination with the use of ambient temperatures.

As a result of this ultrafiltration, green color-forming precursors and some water pass through the membrane to form an ultrafiltrate. The protein and some water remains above the membrane and are retained as a retentate. The retentate is liquid in form. Water can be added to the retentate as or after it loses some of its water through the membrane. If desired the retentate can be recycled either with or without the addition of more water, and passed over the membrane again, that is, one or more additional times.

As previously indicated, the extract subjected to ultrafiltration must be maintained under an inert gas blanket. This inert gas blanket should be maintained until substantially all of the green color-forming bodies have been removed by the ultrafiltration process.

Membranes suitable for the ultrafiltration process herein are commercially available. Any of the commercially available membranes which have a pore size stated above and which are suitable for separating protein size molecules from smaller molecules are suitable for use herein. A number of such membranes are described in the previously referred to *Chemical Engineering Progress* article at page 32. For example, the Diaflow XM-100 and Diaflow PM-10 membranes produced by Amicon Corp. are suitable for use herein. The Diaflow XM-100 membrane is estimated to have an average pore size radius of approximately 60 angstroms. The Diaflow PM-10 membrane is estimated to have an average pore size radius of approximately 20 angstroms.

The retentate emitting from the ultrafiltration step can then be subjected to conventional acid precipitation to remove the protein therefrom. In other words, the pH of the retentate is adjusted to range from 3.5 to 6, preferably 4 to 5 with 4.5 being optimum by the addition of an acid, and the protein is precipitated from the retentate as a solid. The precipitated protein is then separated from the remaining liquid phase, i.e., the retentate, by any conventional physical separation process, for example, by centrifugation. The recovered protein can have its pH adjusted to be more or less neutral by the addition of a base, for example, sodium hydroxide, potassium hydroxide or sodium carbonate. Preferably, the recovered protein is dried by any conventional drying method, such as spray-drying or freeze-drying.

Protein isolate can be recovered from the retentate by another method. In this method the retentate is subjected to further ultrafiltration utilizing the same equipment as was previously utilized to remove the green color-forming bodies. This further ultrafiltration concentrates the retentate by separating some of the water away from the larger molecule protein. The remaining water can be removed by any conventional drying process, for example, freeze-drying or spray-drying to provide dried protein isolate.

The protein isolate recovered after utilizing inert gas blanketing during alkali extraction and ultrafiltration to remove green color-forming precursors is light colored. In other words, it is characterized by the white, gray, light brown, tan, light green-gray, or very light green color previously mentioned. When it is added as a protein supplement to a food product, the food product has an appetizing appearance and is not characterized by a green cast or by the green color normally associated with protein isolated from sunflower meal by conventional alkali extraction/acid precipitation processes. The green color does not appear even in basic milieu. Thus the protein isolated by this embodiment of the invention can be utilized in acid, neutral or basic pH foods such as breakfast cereals, meat products, peanut butter, imitation dairy products, pet foods or snack products and the like, as a protein supplement thereto without changing the appetizing appearance of these food products.

The following examples further illustrate both embodiments of the novel process herein and the use of the light-colored protein isolated by these embodiments as additives to food products without disturbing the appetizing appearance of the food products. During the course of the following examples, no external heating or cooling source is applied during the protein isolation method set forth therein; thus, all the operations therein are carried out at more or less room temperature.

EXAMPLE 1

300 ml. of water is placed in a 600 ml. beaker. This water is then purged with nitrogen for 5 minutes. Then with the nitrogen blanket maintained over the water in the beaker, 20 grams of sunflower meal is added to the water. The weight ratio of water to meal is 15:1. The pH of the water is then adjusted to 10.0 by the addition of sodium hydroxide. The water/sunflower meal mixture is then mixed for 1 hour by the use of a magnetic stirrer. The nitrogen blanket is maintained during the pH adjustment and mixing. The mixture is then subjected to centrifugation while the nitrogen blanket is still maintained, and the extract phase, that is, the liquid phase, is separated and recovered. To the extract phase still under a nitrogen blanket is added hydrochloric acid to adjust the pH of this phase to 4.5. The nitrogen blanketing is now discontinued. As a result of the pH adjustment to 4.5, protein precipitates from the extract phase. This protein is separated from the extract phase by centrifugation. This precipitated protein is then dried in a freeze dryer. A yield of 4.0 grams is achieved. The color of the produced protein isolate is very light green. The protein isolate is incorporated in a breakfast cereal at a level of 25 percent by weight to supplement the protein therein. This food product has a slightly acid pH. The food product with the protein isolate incorporated therein continues to have an appetizing appearance; it is not characterized by a green cast or by the intense green color normally associated with protein isolated by conventional alkali extraction/acid precipitation methods. The protein isolated herein is not suitable for use in basic milieu since in this milieu its color becomes an intense green.

EXAMPLE 2

Twenty grams of sunflower meal is alkali-extracted under nitrogen blanket and thereafter centrifuged under a nitrogen blanket just as in example 1. The extract separated by centrifugation still under a nitrogen blanket is then subjected to ultrafiltration. This ultrafiltration is carried out utilizing a Diaflow XM-100 porous membrane previously referred to; the membrane is estimated to have an average pore size radius of approximately 60 angstroms. The extract is placed in a nitrogen blanketed reservoir, then extract from the reservoir is passed as a thin layer (0.02-inch thick) over the porous membrane with 16 p.s.i.g. pressure applied to it by a head of nitrogen over it which is being utilized as an inert gas blanket. Green color-forming precursors and some water pass through the membrane and are recovered below the membrane as the ultrafiltrate. The protein in the extract and some of the water is retained above the membrane as the retentate. The retentate having passed over the membrane is recirculated into the reservoir containing the extract phase. The water which is lost through the membrane into the ultrafiltrate is continuously replaced by addition of water into the extract phase in the reservoir. This procedure is carried out until water having a volume of four times the original volume of the extract has been added to the reservoir. At all times during the procedure the extract being treated and the retentate is kept under a nitrogen blanket. At the end of the procedure, the retentate is contained in the reservoir; it contains 3 grams of dissolved solids. Nitrogen blanketing is now discontinued. The retentate then has its pH adjusted to 4.5 by the addition of hydrochloric acid. This pH adjustment causes protein to precipitate from the retentate. The precipitated protein is separated by centrifugation, has its pH adjusted to 7 by the addition of sodium hydroxide, and is then freeze-dried to provide a yield of 3 grams of protein isolate. This protein isolate is light tan colored. It retains its light color in acid, neutral or basic milieu; in other words, there is no intense green color appearance in basic milieu. This protein isolate is utilized as the protein in an imitation milk product containing by weight 3.7 percent emulsified vegetable fat, 2.0 percent corn syrup solids, 4.0 percent lactose, 3.0 protein, 0.1 percent sodium phosphate, 0.1 percent carrageenan and the balance water. The imitation milk containing the protein isolate retains its appetizing appearance, that is, it is not characterized by a green cast or a green color.

When in the above example, a Diaflow PM-10 membrane is utilized instead of a Diaflow XM-100 membrane, 5.5 grams of light tan protein is recovered instead of 3 grams. This protein isolate retains its light color in acid, neutral or basic milieu.

Light-colored protein isolate which remains light colored in basic milieu is also achieved when in the above example protein is recovered from the retentate by concentration of the retentate to a 20 weight percent solution by the use of the same ultrafiltration procedure previously used for separating out green color-forming precursors but without the addition of new water. The concentrated retentate is then freeze-dried to provide a yield of 3 grams of substantially pure protein isolate which remains light colored even in basic milieu.

When in the above examples inert gases other than nitrogen, for example, helium, or argon are utilized, the same results of obtaining protein isolate having a light color are achieved. Equal results of obtaining light-colored protein are also achieved when in the above examples the pH is adjusted with other acids and bases than those utilized in the above examples, for example, when sulfuric acid replaces the hydrochloric acid utilized in examples 1 and 2 above, or when potassium hydroxide replaces the sodium hydroxide utilized in examples 1 and 2 above.

The preferred embodiment of this invention can also be carried out in conjunction with the invention described in the copending application of David E. O'Connor and John E. Hunter entitled "Preparing Light-Colored Protein Isolate From Sunflower Meal (Case III)," Ser. No. 856,196 filed concurrently herewith. In other words, the alkali extraction step of the preferred embodiment of this invention can be carried out with reducing agent present. This use of both inert gas blanketing and also reducing agent insures the minimization of green color formation.

This invention can also be carried out in conjunction with the invention described in the copending application of David E. O'Connor entitled "Preparing Light-Colored Protein Isolate From Sunflower Meal (Case I)," Ser. No. 856,164 filed concurrently herewith. In other words, the sunflower meal treated according to the present invention can be acid washed previous to alkali extraction.

What is claimed is:
1. A process for isolating light-colored protein from sunflower meal, said process comprising the steps of
   a. alkali extracting sunflower meal under an inert gas blanket to produce a spent meal phase and an extract phase which comprises water, protein, and green color-forming precursors;
   b. separating said phases while maintaining said inert gas blanket and recovering said extract phase;
   c. subjecting said extract phase to membrane ultrafiltration by passing said extract over a semipermeable membrane having an apparent average pore size radius ranging from 10 angstroms to 80 angstroms under a pressure ranging from 10 p.s.i.g. to 100 p.s.i.g. whereby green color-forming precursors and some water pass through said mem- brane to form an ultrafiltrate and protein and some water remains above the membrane and is retained as a retentate, the extract being maintained under an inert gas blanket during ultrafiltration; and d. recovering said retentate.

2. The process of claim 1 wherein in step (c) the membrane has an apparent average pore size radius ranging from 15 angstroms to 70 angstroms and the pressure ranges from 15 p.s.i.g. to 40 p.s.i.g.

3. The process of claim 2 wherein in step (c) the extract is passed over the membrane in the form of a thin layer having a thickness ranging from 0.01 to 0.05 inches.

4. The process of claim 3 wherein the retentate is recycled and passed over the membrane again.

5. The process of claim 3 wherein water is added to the retentate.

6. The process of claim 3 wherein protein is isolated from the retentate utilizing a conventional acid precipitation step followed by physical separation of the precipitated protein.

7. The process of claim 3 wherein protein is isolated from the retentate by further ultrafiltration followed by drying.

* * * * *